United States Patent [19]

Krueger

[11] Patent Number: 4,861,094
[45] Date of Patent: Aug. 29, 1989

[54] CURTAIN SIDED TRAILERS
[75] Inventor: John G. Krueger, Werribee, Australia
[73] Assignee: Krueger Transport Equipment Pty. Ltd., Victoria, Australia
[21] Appl. No.: 140,642
[22] Filed: Jan. 4, 1988
[30] Foreign Application Priority Data Oct. 7, 1987 [AU] Australia ............................ 79448/87

[51] Int. Cl.$^4$ .......................... A63G 9/10; F16C 11/00
[52] U.S. Cl. ..................................... 296/181; 296/143;
403/102; 403/113
[58] Field of Search ................ 296/181, 183, 187, 210,
296/143; 160/330, 333, 334; 403/100, 102, 113;
248/351

[56] References Cited

U.S. PATENT DOCUMENTS

| 1,785,342 | 12/1930 | Gilbert | 403/100 |
| 3,709,552 | 1/1973 | Broadbent | 296/183 |

FOREIGN PATENT DOCUMENTS

| 0051931 | 5/1982 | European Pat. Off. |  |
| 2901597 | 7/1980 | Fed. Rep. of Germany | 296/183 |
| 3538704 | 12/1986 | Fed. Rep. of Germany | 296/183 |
| 1231124 | 5/1971 | United Kingdom . |  |
| 1542812 | 3/1979 | United Kingdom | 296/183 |
| 2049568 | 12/1980 | United Kingdom | 296/181 |
| 1597532 | 9/1981 | United Kingdom . |  |
| 2090799 | 4/1983 | United Kingdom . |  |
| 2130556 | 4/1986 | United Kingdom . |  |

Primary Examiner—Andres Kashnikow
Assistant Examiner—Timothy Newholm
Attorney, Agent, or Firm—Reising, Ethington, Barnard, Perry & Milton

[57] ABSTRACT

A support post for a curtain sided trailer comprises an elongate member arranged to be hung from an overhead rail on the trailer. The elongate member has a roller assembly at one end allowing the post to be displaceable along the rail. A leg is secured to the other end to pivot about a knee joint. The leg is securable to the base of the trailer. A locking member locks the knee joint with the elongate member and leg extending in a straight line so that the post supports the roof of the trailer.

9 Claims, 4 Drawing Sheets

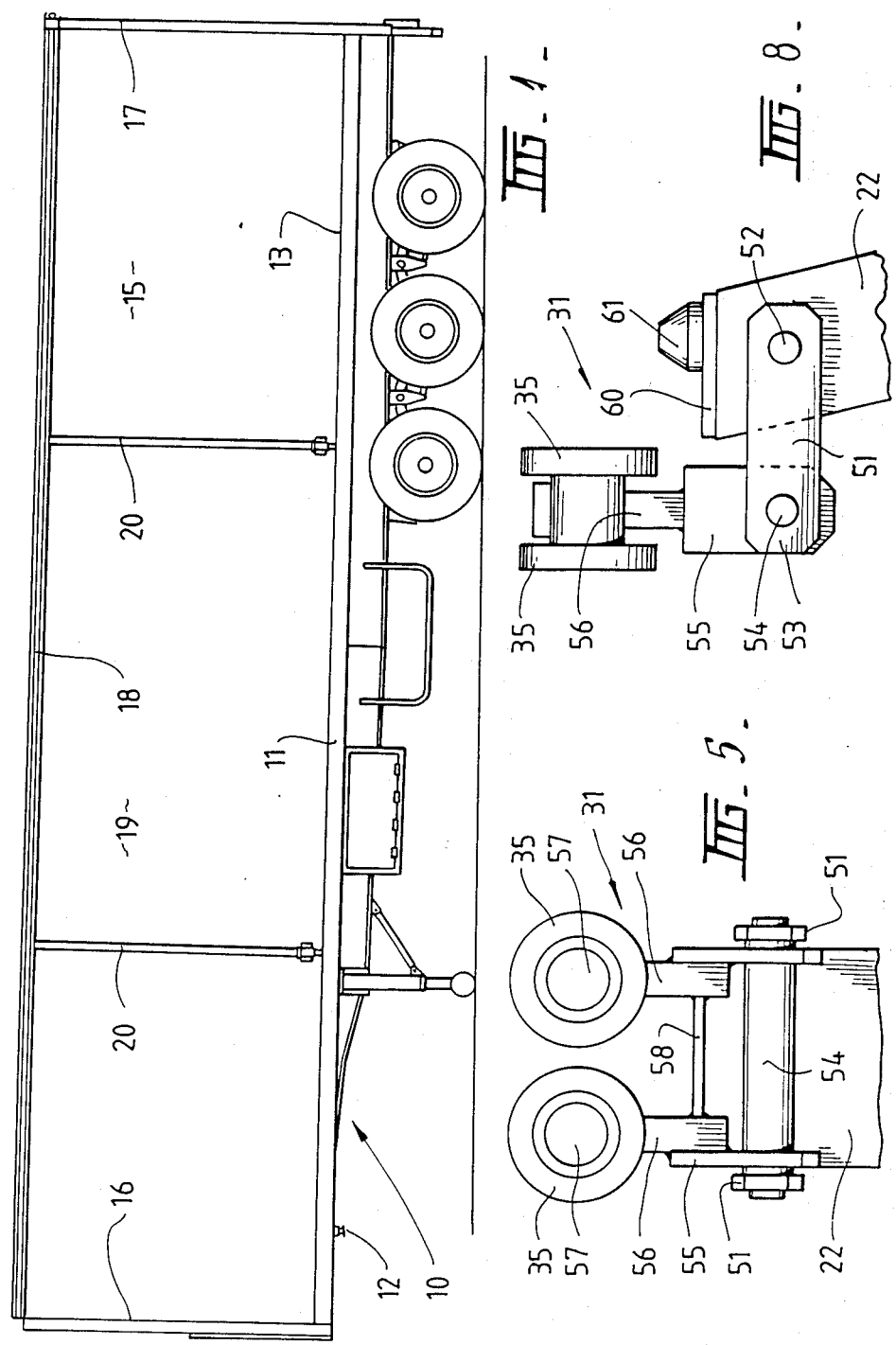

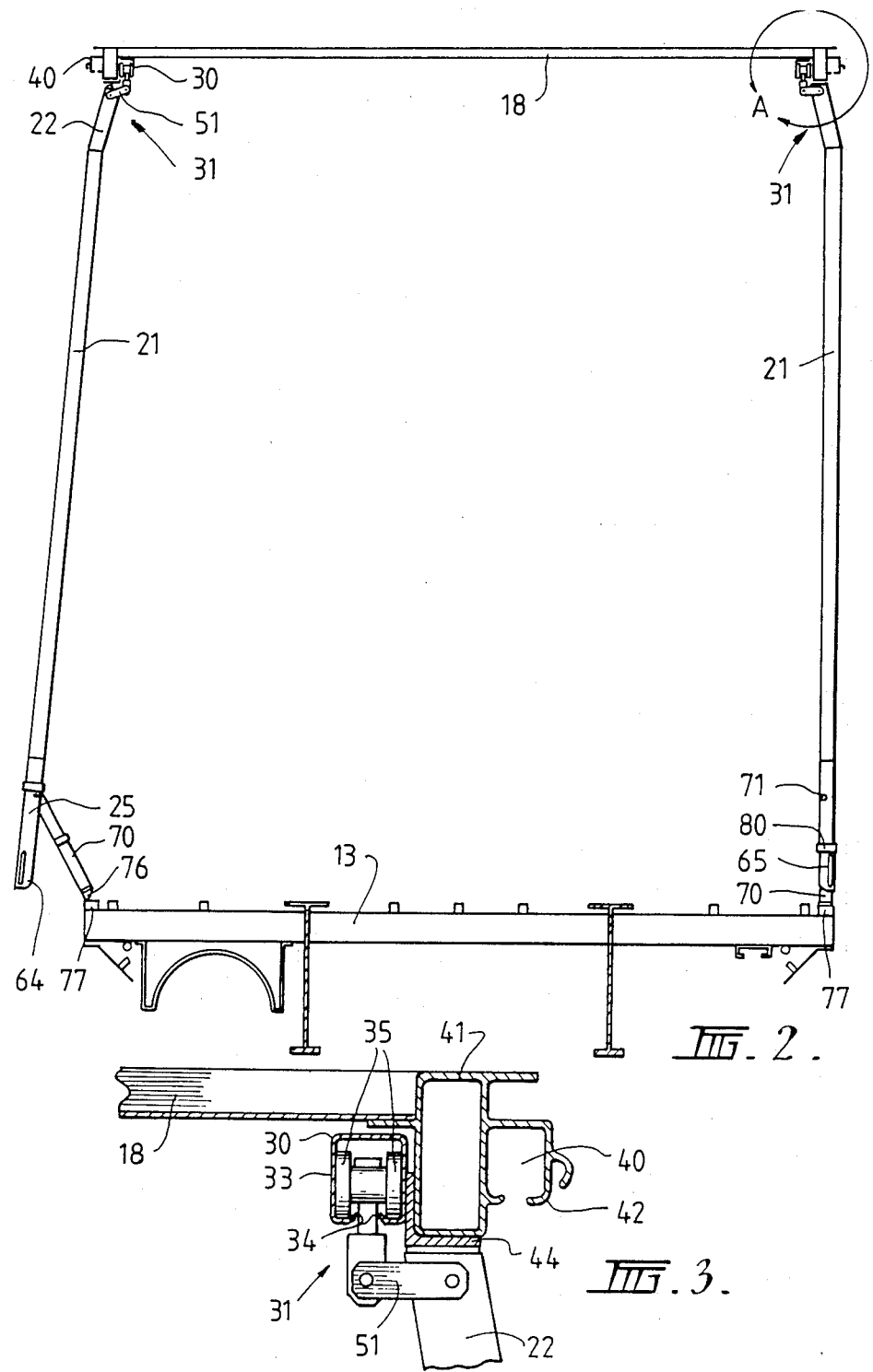

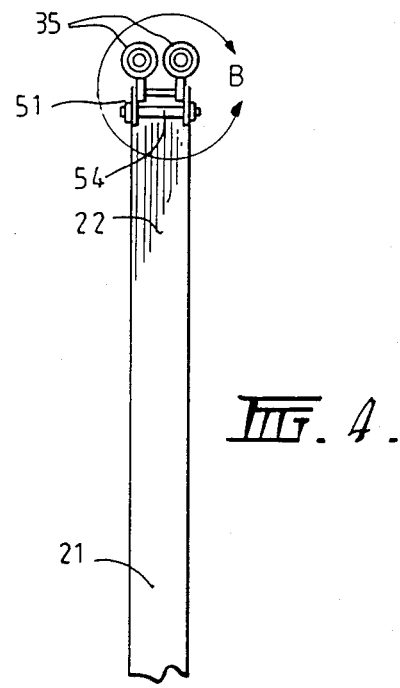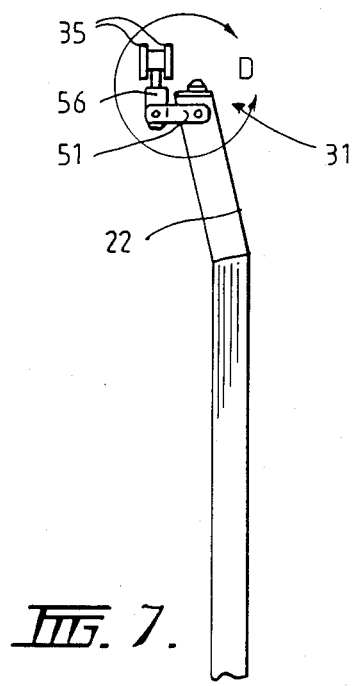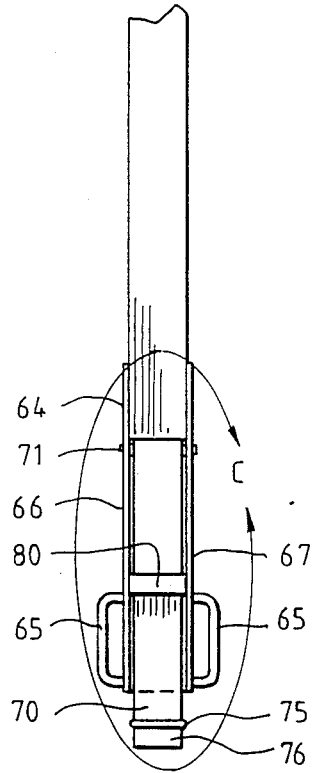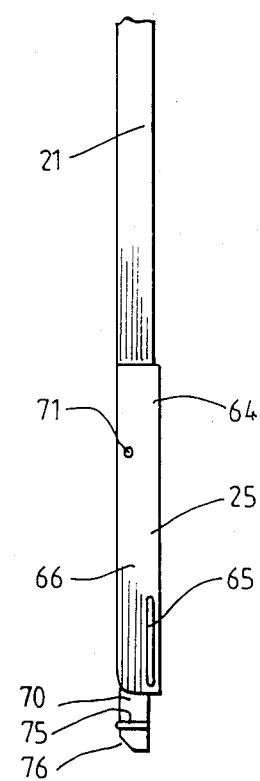
FIG. 4.
FIG. 7.

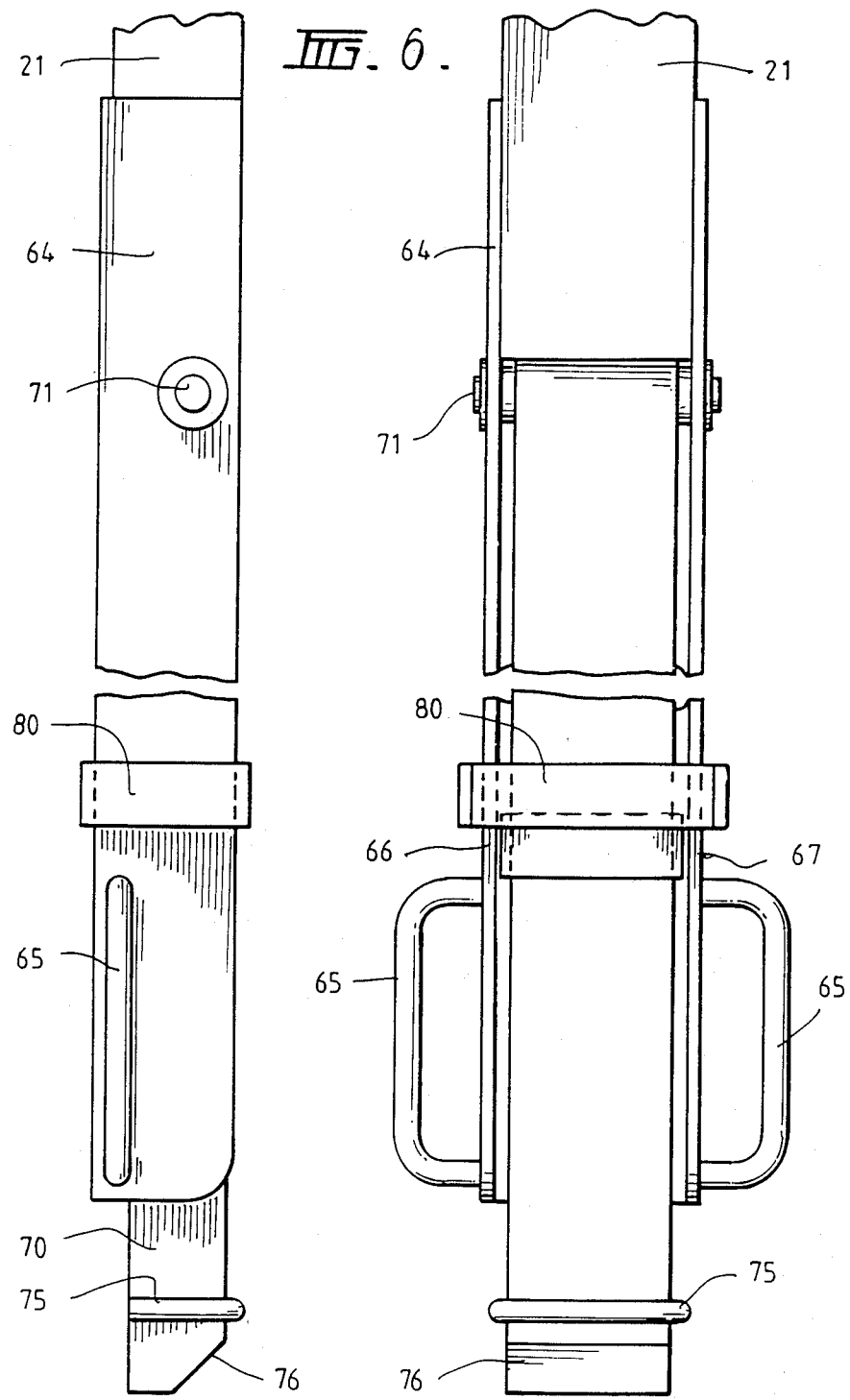

CURTAIN SIDED TRAILERS

This invention relates to improvements in or relating to curtain sided trailers and in particular relates to a post for use with curtain sided trailers.

In recent years there has been an increased demand for large flat trailers that have a built-in roof structure and a comparatively open framework so that the trailer can be laden with pellets from the sides. A weatherproof curtain is drawn along the length of each side of the trailer to close in the load without the necessity to use ropes and tarpaulins. This type of trailer involves considerably less time to load and unload and provides adequate protection for each load. The length of the trailers may vary but it is understood that the large trailers are up to 40 feet in length.

The problem with trailers of this kind is that to allow easy access from the side of the trailer the side supports for the roof should be kept to a minimum. However, with a long trailer the roof tends to sag if it is not supported at spaced intervals along its length. Many trailers flex when laden and unladen. This flexing of the trailer coupled with the weight of the roof causes the roof to place extreme stresses on the end supports of the roof which have been known to cause cracking of the welds that join the support pillars at each end of the assembly. It has thus been proposed to use a comparatively light roof structure made of aluminium instead of steel.

It is known to use removable side support pillars which are removed when the trailer is loaded or unloaded and then are placed in position to support the roof for transport. However, it has proved difficult to remove and replace the pillars and the pillars become prone to damage when removed. Another proposal has been to mount the pillars on a pivoting arm so that the arm and pillars may be pivoted away from the edge of the trailer for loading purposes. However, this is a cumbersome design and still leaves the pillar and support assembly prone to damage during the loading operation.

It is consideration of these problems that has brought about the present invention.

According to the present invention, there is provided a support post for a curtain sided trailer comprising an elongate member having a roller assembly secured to one end to be pivotable thereto, a leg secured to the other end to pivot about a knee joint, and means to lock the knee joint with the elongate member and leg extending in a straight line.

One embodiment of the present invention will now be described by way of example only with reference to the accompanying drawings in which:

FIG. 1 is a side-on view of a curtain sided trailer,

FIG. 2 is a sectional view of FIG. 1 illustrating location of support posts for the roof of the trailer both in the fixed and displaced positions, FIG. 3 is an enlarged view of the detail shown by the arrow A on FIG. 2, FIG. 4 is a side-on view of a post illustrated in FIGS. 1 and 2, FIG. 5 is a detailed view of the matter enclosed in the circle marked B on FIG. 4, FIG. 6 is a detailed view of the matter illustrated within the area marked C in FIG. 4, FIG. 7 is an end-on view of the post shown in FIG. 4, and FIG. 8 is an enlarged detailed view of part of the post shown in FIG. 7 within the circle marked D.

As shown with particular reference to FIGS. 1 and 2, a curtain sided trailer 10 comprises a substantially flat trailer assembly 11 arranged to be articulately coupled to a prime mover or tractor (not shown) via a fifth wheel assembly 12. The trailer assembly 11 comprises a substantially flat open bed 13 which supports a rectangular enclosure 15 that has closed end portions 16, 17, a roof 18 and open sides 19 and 20. The roof 18 is manufactured of aluminium sheet and is secured spaced above the bed 13 via a rectangular framework that forms the closed ends 16 and 17 of the trailer. It is understood that the rear end 17 of the trailer may incorporate doors (not shown). As shown in FIG. 1, the span of the roof 18 is supported by two side support post assemblies 20 that are equally spaced along the length of the trailer. It is understood that the number and spacing of the support post assemblies may vary depending on the length of the trailer. It is further understood that the spacing of the support posts vary on each side of the trailer so that at any particular point two support posts are not directly opposite one another.

Although not shown in the drawings the side of the trailer is arranged to be covered by a curtain preferably made of nylon, plastics or alternatively, tarpaulin. In a preferred embodiment the curtain slides horizontally or longitudinally of the trailer along rails positioned adjacent the floor and the top of the container. An example of a curtain sided trailer of this kind is disclosed in U.S. Pat. No. 3,709,552. The assembly incorporates suitable vertical and horizontal tensioning means. It is however, understood that this invention is applicable to vertical curtains that roll down from the roof of the container.

As shown with particular reference to FIGS. 2 and 3 each post assembly 20 is hung from a rail 30 that is secured to the underside of the roof 18 to extend longitudinally of the trailer at each side of the trailer. The post assembly 20 comprises an elongate steel member 21 of square cross-section with a roller assembly 31 pivotally secured at one end 22 and a leg 40 pivotally secured to adjacent the other end 25. The roller assembly is hung from the rail to allow the post to slide longitudinally of the trailer. For loading and unloading purposes the post can be displaced to either end of the trailer to leave the whole floor of the trailer clear of obstructions.

As can be seen from FIG. 3 the rail 40 that supports the curtain (not shown) is an aluminium extrusion that comprises a body 41 of rectangular box cross-section with a laterally projecting rail section 42 that supports the curtain (not shown). The aluminium extrusion is secured to the underside of the container roof and is supported at either end by the end portions 16 and 17. The underside of the box section is provided with a right-angled bracket 44 that is secured thereto with its underside running parallel to the underside of the box section. A series of apertures (not shown) are provided through the box section and the lower plate of the angled bracket 44 at selected positions along the length of the trailer to act as location points for the post assemblies. The rail 30 from which the post assemblies are hung comprises an extrusion of substantially rectangular cross section that is secured to the angled bracket 44. The extrusion has downwardly projecting arms 33 with upturned flanges 34 that define a location groove on each side of the rail into which rollers 35 of the roller assembly 31 hang. The upturned flanges 34 prevent separation of the rollers from the rail. It is understood that the curtain rail 40 and the rail 30 for the roller assembly 31 may be formed as a single extrusion.

Details of the roller assemblies 31 are illustrated with reference to FIGS. 5 and 8. A pair of rectangular brackets 51 are supported one on each side of the elongate member 21 about a pivot shaft 52. The opposite ends 53 of the brackets 51 support about a shaft 54 a pair of flanges 55 each of which is in turn welded to a web 56 through which a shaft 57 carrying a pair of rollers 35 is located. The webs 56 lugs are interconnected by a cross member 58 and each support a pair of rollers 35 so that as shown in FIG. 5 the rollers are slightly spaced with their axes of rotation parallel.

As can be seen from FIG. 7 the elongate member 21 has an inclined end portion 21 which, when the elongate member is secured to the side of the trailer means that the end portion 22 extends inwardly from the side of the trailer. The inclined end portion 22 terminates in an end flange 60 with a tapered location pin 61 projecting therefrom. The tapered location pin 61 is arranged to engage within one of the apertures provided in the rectangular flange 44 at the base of the box section 41 of the aluminium extrusion.

The opposite end 25 of the elongate member 21 terminates in a sleeve 64 of channel section that is welded to the exterior of the end of the elongate member. This sleeve defines an open rectangular enclosure and has projecting from opposed wall portions 66, 67 a pair of handles 65. An elongate leg 70 of rectangular cross section is positioned within the enclosure defined by the end of the elongate member and the sleeve for pivotal movement thereto about a pin 71 that locates through apertures in the side walls 66, 67 of the sleeve 64 and through the cross section of the leg 70. The leg extends downwardly past the end of the sleeve 64 as shown in FIG. 6 and terminates in an enlarged end flange 75 with an inclined tongue 76.

As can be seen with reference to FIG. 2 the inclined tongue 76 may be located within a steel block 77 that is mounted on the edge of the trailer base 13. The flange 75 locates the tongue 76 in position within the block 77. It is understood that the blocks 77 are positioned along the length of the trailer at predetermined positions that define the fixed positions of the post assemblies 20. FIG. 2 illustrates the post assemblies with the protruding leg 40 in two positions. On the left hand side the leg 40 is bent at the knee defined by the shaft 71 to reduce the effective length of the post assembly 20 and allow the tongue 76 to be released from the block 77 on the trailer thereby leaving the post assembly free to be displaced along the rail 30 mounted on the underside of the roof 18. In the position shown on the right hand side of FIG. 2, the leg 40 is straight with its longitudinal axis coaxial with the elongate member. This is the locked position in which the post assembly assumes its maximum length. The tongue 76 locates within the block 77 on the trailer and the length of the post assembly is such as to support the roof. To hold the post assembly in the locked position a locking sleeve 80 is positioned around the exterior of the external sleeve 64 to be a sliding fit thereon. When the sleeve 80 is lowered to the position shown in FIG. 6 it embraces the sleeve and leg to prevent pivotal movement of the leg 40 relative to the sleeve 64 about the knee.

To unload or load the trailer the post assemblies 20 are first displaced from their operative positions shown in FIG. 1 where they act as roof supports by lifting the locking sleeve 80 clear of the leg 40 and pulling outwardly on the handles 65 to cause the post to bend about the knee as shown on the left hand side of FIG. 2. This bending of the leg 40 reduces the overall length of the post assembly releasing the tongue 76 from the block 77 in the trailer. The pivotal interconnection of the roller assembly 31 on the other end 22 of the elongate member 21 allows the post assembly 20 to be longitudinally slid along the rails 30 to either end of the trailer. Although the support for the roof is therefore reduced and a certain amount of sagging of the roof takes place it is of no concern whilst the trailer is being either loaded or unloaded. Once the trailer has been loaded the operator takes the post assemblies 20 and slides them back to their operative positions. With each tongue 76 located above the respective block 77 in the trailer, the operator pushes inwardly on the handles 65 of the sleeve 64 that has the effect of forcing the leg to assume the straight or locked position shown on the right hand side of FIG. 2. The distance between the handle 65 and knee or pivot axis provides sufficient moment to force the assembly into the locked position whilst at the same time lift the roof 18 take up any sagging. The locking sleeve 80 is then slid over the assembly as shown on the right hand side of FIG. 2. In this manner the roof 18 is adequately supported by the post assemblies 20 and the curtain may be drawn across the assembly and tied up by conventional fastening or locking latches. The trailer is then ready for transportation.

The assembly described above has the advantages that a comparatively light aluminium roof structure may be incorporated in the assembly with adequate end and side supports provided by the post assemblies. There is no necessity to totally remove the post assemblies for loading and unloading and by simple means they can be slid to either end of the trailer along the rails supported by the roof to facilitate loading and unloading. In this way there is little likelihood of damage to the post assemblies caused by their removal during the unloading and loading operation.

It is understood that the length of the travel of the post assemblies would vary depending on the length of the trailer. However, in a preferred embodiment it is envisaged that the rail on which the post assemblies slide would extend along the full length of the trailer so that the post assemblies may be located at either end of the trailer. The number and spacing of the post assemblies would also vary in dependence on the size and designated use of the trailer. Although in the preferred embodiment the post assemblies are for use with curtain sided trailers it is understood that the invention in its broadest aspect is not restricted to this type of trailer and it is understood that the post assemblies could be used with other types of trailers.

I claim:

1. A support post for a curtain sided trailer, said post comprising; an elongate member having first and second ends, a roller assembly, a rigid link pivotally connected to the first end of the elongate member at a pivot point and pivotally connected to the roller assembly for guiding the first end and pivot point in arcuate movement to a position laterally beside the roller assembly, said rigid link being constrained, via its connection with said elongate member at said pivot point, from any further motion with respect to said elongate member, a leg secured to the second end at a knee joint for pivotally moving the leg with respect to the elongate member, and means to lock the knee joint with the elongate member and leg extending in a straight line.

2. The support post according to claim 1 wherein the end of the elongate member that is connected to the roller assembly is provided with location means.

3. The support post according to claim 1 or claim 2 wherein the roller assembly comprises at least one roller supported by a bracket that is pivotally secured to the elongate member via said rigid link such that the roller is to be located within an overhead rail to allow the support post to be hung from the rail.

4. The support post according to claim 3 wherein the end of the elongated member that and the roller assembly is inclined to the axis of the elongate member so that the plane of the end of the elongated member is outside the vertical plane containing the support rail for the roller assembly.

5. The support post according to claim 4 wherein the leg fits within the end of the elongate member and is mounted to be pivotable thereto at a position spaced inward from the end of the elongate member so that the end of the elongate member and part of the leg overlap.

6. The support post according to claim 5 wherein the means to lock the leg comprises a slide mounted around the elongate member and slidable thereon so that when placed over the overlapping portion it causes the elongate member and leg to straighten about the knee.

7. The support post according to claim 6 wherein the end of the elongate leg is provided with location means that locates within blocks mounted on the trailer floor.

8. A curtain sided trailer assembly, said assembly comprising: a trailer with a substantially flat base supporting a roof structure spaced above the base; end structure positioned at the front and rear of the trailer respectively for supporting the roof structure above the base; a rail assembly positioned against the underside of the roof over each lateral edge of the trailer; a support post comprising an elongated member having first and second ends and having a roller assembly and means for pivotally connecting the elongate member to said roller assembly to guide the elongate member in arcuate movement to a position supporting the roof assembly with the first end of the elongate member laterally beside the roller assembly and to a second position to be hung by the roller assembly, a leg secured to the second end at a knee joint for pivotably moving the leg with respect to the elongated member, and means to lock the knee joint with the elongated member and the leg extending in a straight line; the rail assembly comprising a first rail extending longitudinally of the trailer and arranged to carry support means for a curtain, a second rail that extends longitudinally of the trailer arranged to support said roller assemblies of said support post, each post being hung from the roof of the trailer by location of the roller assembly in the second rail, an end of the leg being releasably located against the floor of the trailer to allow for the post to be displaced towards either end of the trailer along the second rail when the elongated member and leg are bent about the knee joint, and for the post to be fixed in a position along the length of the trailer to act as a side support for the roof structure when the elongate member and leg are locked.

9. A trailer assembly, said assembly comprising: trailer with a substantially flat base supporting a roof structure spaced above the base; end structure positioned at the front and rear of the trailer respectively for supporting the roof structure above the base; a rail assembly positioned against the underside of said roof structure; support post comprising an elongate member having first and second ends, roller assembly supported within the rail assembly, link means pivotally connected to the first end of the elongate member at a pivot point and to the roller assembly for guiding the first end and pivot point in arcuate movement to a first position allowing the support post to hang from the rail for displacement longitudinally of the rail and a second position laterally beside the roller assembly to support the roof structure, said rigid link being constrained, via its connection with said elongate member at said pivot point, from any further motion with respect to said elongate member.

* * * * *